United States Patent

[11] 3,588,669

| [72] | Inventors | Armistead L. Wellford;<br>John H. Cutler, Waynesboro, Va. |
|---|---|---|
| [21] | Appl. No. | 762,868 |
| [22] | Filed | Sept. 26, 1968 |
| [45] | Patented | June 28, 1971 |
| [73] | Assignee | General Electric Company |

[54] CURRENT DRIVE ARRANGEMENT FOR SYMMETRICAL SWITCHING CIRCUITS
2 Claims, 7 Drawing Figs.

| [52] | U.S. Cl. | 321/45 |
|---|---|---|
| [51] | Int. Cl. | H02m 7/52 |
| [50] | Field of Search | 321/43, 44, 45; 331/47, 52 |

[56] References Cited
UNITED STATES PATENTS

| 3,305,759 | 2/1967 | Corey | 321/25 |
|---|---|---|---|
| 3,344,335 | 9/1967 | Walker | 321/45X |
| 3,412,316 | 11/1968 | Kernick | 321/45 |
| 3,263,122 | 7/1966 | Genuit | 321/44X |
| 3,305,761 | 2/1967 | Heinrich et al. | 321/45 |
| 3,414,797 | 12/1968 | Morgan | 321/44X |
| 3,467,852 | 9/1969 | Murray et al. | 321/45 |

FOREIGN PATENTS

| 1,285,613 | 1/1962 | France | 321/45 |
|---|---|---|---|
| 937,294 | 9/1963 | Great Britain | 321/45 |

*Primary Examiner*—William H. Beha, Sr.
*Attorneys*—I. D. Blumenfeld, Frank L. Neuhauser, Oscar B. Waddell and Melvin M. Goldenberg ABSTRACT: A current drive arrangement in a symmetrical switching circuit. Alternately conducting switching transistors respectively connect the positive and negative terminal of a DC source to a load. A single magnetic device, a current transformer having a plurality of windings, is provided. Drive current is coupled from a first winding to the bases of the transistors to turn one transistor on and bias the other transistor off. Another winding of the transformer is connected to couple load current to the transistor bases to provide regenerative drive. When the drive signal reverses in polarity, the magnetic device couples the drive current and the load current to the transistors to provide proper commutation.

INVENTOR.
ARMISTEAD L. WELLFORD
JOHN H. CUTLER

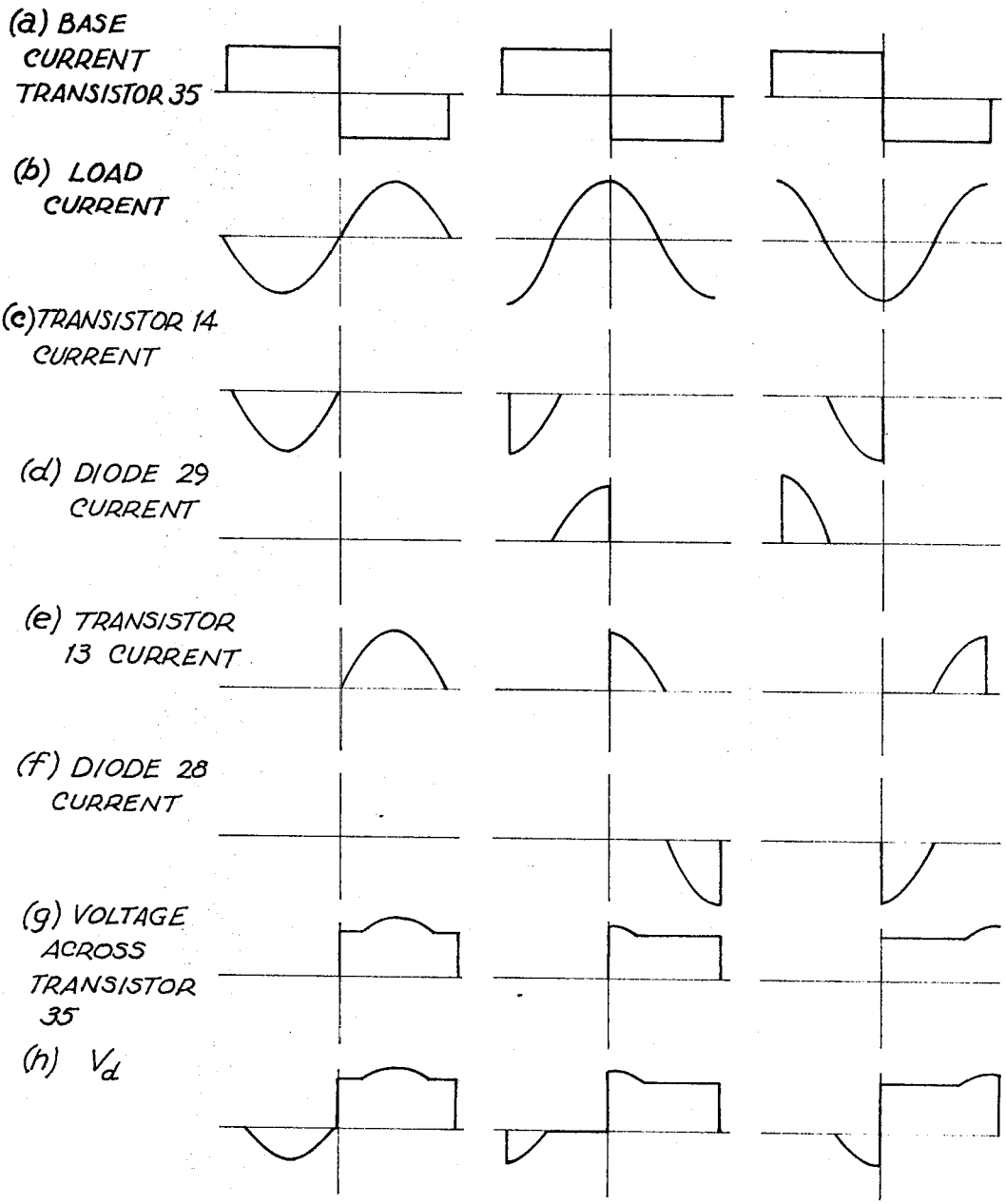

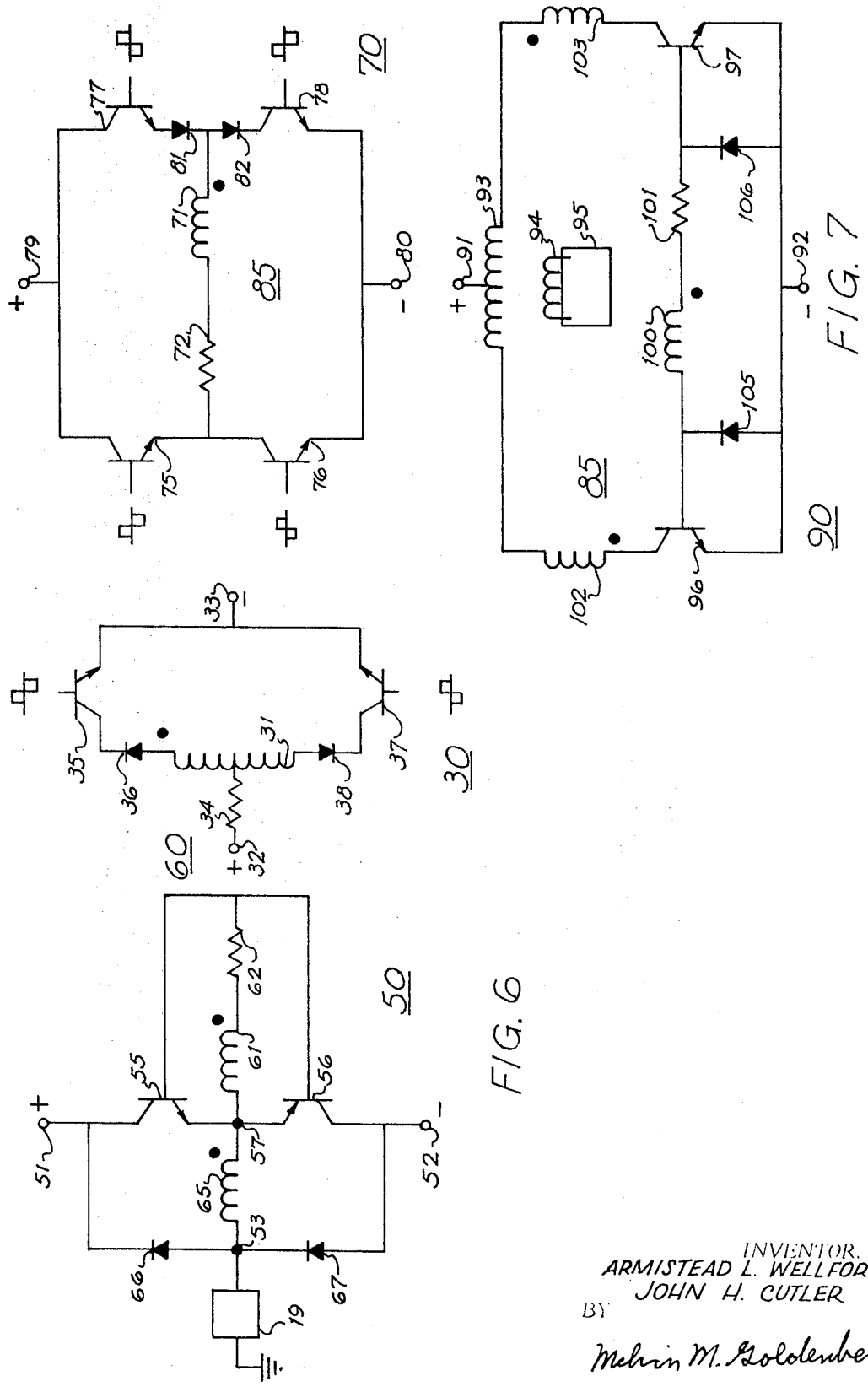

3,588,669

CURRENT DRIVE ARRANGEMENT FOR SYMMETRICAL SWITCHING CIRCUITS

BACKGROUND OF THE INVENTION

This invention relates to switching circuits. More particularly, it relates to a current drive arrangement for symmetrical switching circuits.

Symmetrical switching circuits comprise a first and a second switching element which are alternately rendered conductive. Such circuits have many uses as for instance in inverters. However, they may also be used in such applications as the provision of audio frequencies by digital methods.

In a typical inverter circuit, two transistors are connected with their emitter-collector circuits in series between the positive and negative terminals of a DC source. The transistors are alternately turned on to alternately connect the positive and negative terminals to an output terminal. In this manner, an AC output from a DC source is provided.

A current drive arrangement is utilized to supply current to the bases of both the transistors in order to effect switching. The current drive arrangement must supply drive currents of opposite polarities during alternate half cycles of inverter operation. In addition, in order to operate the inverter circuit efficiently, regenerative drive may be provided. In a regenerative drive arrangement, load current flowing from one transistor to the output terminal is coupled to the bases of the transistors by a current transformer. The winding ratio of this transformer may be chosen so that only as much current drive as is necessary is supplied to support conduction in the transistor that is on during each half cycle. A regenerative system requires less power to drive the transistors than a system in which a constant current is applied to the transistor bases. For a fuller discussion of regenerative drive systems in inverters, reference should be had to U.S. Pat. No 3,317,815 to Stanley Y. Merritt, assigned to the General Electric Company.

Current drive arrangements are generally complex due to the several requirements for successful inverter operation. First, one transistor must be turned on while the other is positively held off. This is necessary in order to prevent "shoot-thru," a direct short circuit between the two terminals of the DC source. Also, load current must be coupled to the bases of the transistors to provide regenerative drive. Finally, reliable commutation must be provided to bias the conducting transistor off at the end of each half cycle.

It is a relatively simple matter to provide drive current to bias one transistor on and hold the other off. It is a more difficult matter, however, to provide a reliable regenerative drive and commutation arrangement. In the past, it has been necessary to provide a number of magnetic devices such as current transformers to provide desired coupling between the load current and bases of the transistor for regenerative drive under both leading and lagging load conditions. Furthermore, delicate circuit balances have been required to provide low impedance paths for various lagging transistor drive currents. For example, it has been necessary to short circuit a winding which provides a lagging current drive which holds one transistor on at the end of a half cycle.

The use of a number of magnetic devices presents certain disadvantages. The primary disadvantage is that of cost. Many hand operations are generally required in the manufacture of a magnetic device for an inverter, so that the elimination of a magnetic device from such a circuit results in a significant saving in manufacturing cost. Furthermore, the use of a magnetic device introduces both core loss and conduction losses into the system, and it reduces the efficiency of the circuit. In addition, where it is necessary to maintain delicate circuit balances, the reliability of the circuit is reduced.

SUMMARY OF THE INVENTION

It is therefore an object of the present invention to provide a current drive arrangement for a symmetrical switching circuit in which only a single magnetic device is required to perform the drive current coupling, regenerative drive coupling, and commutation functions.

It is another object of the present invention to provide a current drive arrangement for a symmetrical switching circuit in which core losses and conduction losses due to the use of transformers are minimized in order to provide efficient operation.

It is a further object of the present invention to provide an arrangement of the type described in which only the necessary amount of drive current is supplied to the switching elements.

It is yet another object of the present invention to provide a symmetrical switching circuit of the type described which is reliable in operation under all load conditions.

It is also an object of the present invention to provide a current drive arrangement for a symmetrical switching circuit of the type described which is simple in construction and efficient and reliable in operation.

Briefly stated in accordance with the present invention there is provided a current drive arrangement for a symmetrical switching circuit in which a single magnetic device is utilized to couple the desired currents to the switching elements to assure proper biasing, coupling of regenerative drive, and commutation. Alternately conducting transistors are utilized to respectively connect the positive and negative terminals of a DC source to a load. The magnetic device first couples drive current to turn one transistor on and bias the other transistor off. Once conduction in one transistor is established, the magnetic device couples load current to the switching elements to provide regenerative drive. When the drive current reverses in polarity, the magnetic device couples the drive current to the transistors to provide proper commutation.

BRIEF DESCRIPTION OF THE DRAWINGS

The foregoing objects and features of novelty which characterize the invention are pointed out with particularity in the claims, forming the concluding portion of this specification. Various embodiments of the invention, its advantages, and specific objects attained with its use may be further understood by reference to the following description in conjunction with the following drawings.

Of the drawings:

FIG. 2 is a timing diagram of the waveforms produced in the circuit of FIG. 1 when the load is of the resistive type;

FIG. 3 is a timing diagram of the waveforms produced in the circuit of FIG. 1 when the load is of the leading type;

FIG. 4 is a timing diagram of the waveforms produced in the circuit of FIG. 1 when the load is of the lagging type;

FIG. 6 is a schematic representation of a half-bridge symmetrical switching circuit including two complementary transistors constructed in accordance with the present invention; and FIG. 7 is a schematic representation of a center-tapped output symmetrical switching circuit constructed in accordance with the present invention.

DESCRIPTION OF THE PREFERRED EMBODIMENTS

Figure 1:
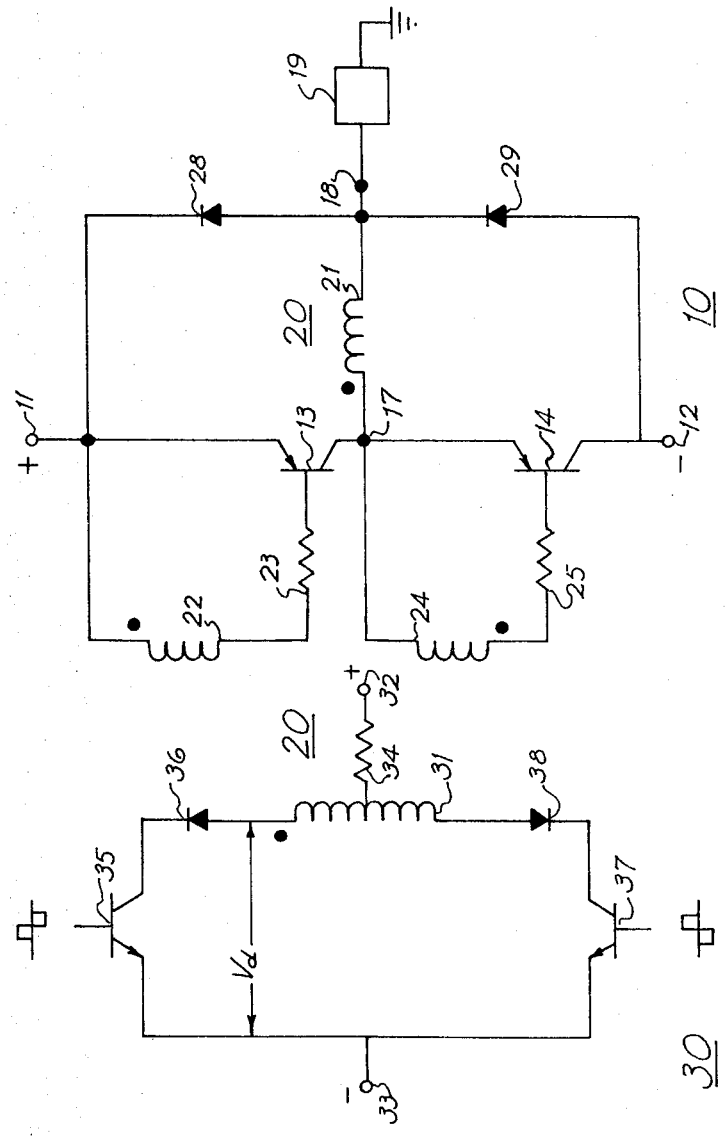
FIG. 1 is a schematic representation of a half-bridge output symmetrical switching circuit constructed in accordance with the present invention.

Referring now to FIG. 1, the symmetrical switching circuit consists of a driver circuit 30, which provides current to initiate switching operation, and an output circuit 10. The output circuit 10 is connected across a unidirectional potential source (not shown) by means of a positive terminal 11 and a negative terminal 12. First and second switching elements, a PNP transistor 13 and a PNP transistor 14, are connected between the terminals 11 and 12, and are alternately turned on to respectively couple the potentials appearing at the terminals 11 and 12 to a central terminal 17, an output terminal 18, and a load 19. The emitter of the transistor 13 is connected to the positive terminal 11, while the collector of the transistor 13 is connected to the central terminal 17. Similarly, the emitter of the transistor 14 is connected to the central terminal 17 while the collector of the transistor 14 is connected to the negative terminal 12.

The symmetrical switching circuit further includes a single magnetic device, a current transformer 20. A winding 21 of the current transformer 20 is connected between the terminal 17 and the output terminal 18 so that load current flows therethrough. For this reason, the winding 21 shall be hereafter referred to as the load current winding. It is from the load current winding 21 that regenerative drive current is coupled to the bases of the transistors 13 and 14. Current is supplied to the base of the transistor 13 by means of a drive winding 22, included in the current transformer 20, and a current limiting resistor 23, which are connected in series in the emitter-base circuit of the transistor 13. Similarly, a drive winding 24 of the current transformer 20 and a current limiting resistor 25 are connected in series in the emitter-base circuit of transistor 14. The drive windings 22 and 24 are oppositely poled with respect to each other. Thus, when a single current is coupled to the windings 22 and 24, voltages of opposite polarity are applied across the transistors 13 and 14. In this arrangement, a "shoot-thru" condition, a direct short circuit between the terminals 11 and 13, is prevented since the transistors 13 and 14 cannot simultaneously be turned on.

A diode is provided with its anode connected to the output terminal 18 and its cathode connected to the positive terminal 11, and a diode 29 is provided with its anode connected to the negative terminal 12 and its cathode connected to the output terminal 18. These diodes are "pump-back" diodes which permit the return of leading or lagging currents to the source when the load is of the reactive type.

The configuration of the output circuit 10, in which first and second switching elements, the transistors 13 and 14, are connected between a pair of potential source terminals, the terminals 11 and 12, to switch an output from one of the terminals to a central terminal 17 and an output terminal 18 is commonly called a half-bridge arrangement.

In the circuit of FIG. 1, PNP transistors 13 and 14 are included in the output circuit 10. Germanium PNP transistors may be conveniently utilized due to their low power turn on requirements and low drive current requirement. However, silicon NPN transistors may be conveniently utilized for high voltage applications.

Drive currents to switch the transistors 13 and 14 is coupled to the output circuit 10 from the driver circuit 30. The driver circuit 30 provides drive current which reverses in polarity at the commencement of each half cycle of circuit operation. The drive circuit 30 comprises a "center-tapped" arrangement in which drive current is supplied to the center tap of a drive current winding 31 included in the current transformer 20 and connected in the driver circuit 30. The center tap of the winding 31 is coupled through a voltage dropping resistor 34 to the positive terminal 32 of a unidirectional potential source (not shown). Current returns to the source from a negative terminal 33. The emitter-collector circuit of an NPN transistor 35 and a directing diode 36 are connected between the dot end of the drive current winding 31 and the negative terminal 33. Similarly, the emitter-collector circuit of an NPN transistor 37 and a directing diode 38 are connected in series between the other end of the winding 31 and the negative terminal 33. Complementary square wave triggering signals are applied to the base of the transistors 35 and 37 from a pulse source (not shown). The frequency of the pulse source is chosen to be the frequency at which it is desired to operate the transistor 37. When the transistor 35 is turned on, the transistor 37 is biased off.

OPERATION OF THE CIRCUIT

At the beginning of each half cycle, the transistors 35 and 37 change state. Let it be assumed that a positive square wave is applied to the base of the transistor 35 to turn it on. At the same time, a negative square wave is applied to the base of the transistor 37 to bias it off. Current then flows from the positive terminal 32 through the resistor 34 to the drive current winding 31. Current flows out the dot end of the winding 31 and is conducted to the negative terminal 33 by the diode 36 and transistor 35. Due to the direction of current flow, the dot end of the winding 31 is negative with respect to the other end. This drive current flowing through the winding 31 is coupled to the bases of the transistors 13 and 14 by the drive windings 22 and 24, respectively.

The dot end of the winding 24 is coupled to the base of the PNP transistor 14 to apply a negative current to its base and turn the transistor on. At the same time, the winding 22 is poled to couple a positive current through the resistor 23 so that a reverse voltage is applied across the transistor 13 to turn it off. Only an amount of drive current sufficient to cause initial conduction of the transistor 14 need be provided.

When load is resistive, the transistor 14 turns on immediately. Once the transistor 14 is turned on, the negative terminal 12 is coupled to the load 19. Load current flows through the transistor 14, terminal 17, and the load current winding 21 to the load 19. Since the dot end of the winding 21 is coupled to the negative terminal 12, the dot end of the winding is negative with respect to the other end. Load current is now coupled from the winding 21 to the windings 22 and 24. The winding 21 is poled so that current flowing in the same direction as that coupled by the drive current winding 31 is applied to bases of the transistors 13 and 14. In this manner, regenerative drive to the transistors 13 and 14 is provided. The circuit operates similarly for reactive loads. If the load is of the leading or capacitive type, the transistor 14 conducts immediately. The diode 29 provides a return path for current from the load to the source while the transistor 14 is conductive. If the load is of the lagging or inductive type, the diode 29 provides a return path for lagging current to the load before load current begins to flow through the transistor 14.

The above-described flow of current through the transistors 13 and 14 and the diodes 28 and 29 with respect to time during the switching cycle may be seen in portions a through f of FIGS. 2, 3 and 4. FIG. 2 is a timing diagram for the circuit when the load is of the resistive type. FIGS. 3 and 4 represent timing diagrams for the circuit when the load is of the reactive type. FIG. 3 is a timing diagram for a leading, or capacitive, load while FIG. 4 is a timing diagram for a lagging, or inductive, load. Part a of the FIGS. 2, 3, and 4 represents the drive current supplied to the transistor 35 included in the drive circuit 30, and part b represents load current. Parts c through f of the FIGS. 2, 3, and 4 represent current flow in the transistor 14, diode 29, transistor 13 and diode 28, respectively.

Additional advantages of the circuit shown in FIG. 1 may be understood by further reference to the FIGS. 2, 3, and 4. It is noted that during the portion of each half cycle in which the load current is sufficient to provide regenerative drive to the transistors 13 and 14 the drive current provided through the winding 31 is superfluous. The circuit efficiency is improved by decoupling the drive winding 31 from the transistor 35 during these portions of each half cycle. When the winding 31 is decoupled, the driver circuit 30 ceases to draw current.

The windings 21, 22, 24, and 31 are all included within the current transformer 20 and are mutually coupled. Thus while the load current winding 20 couples regenerative drive current to the windings 22 and 24, it also couples current to the drive current winding 31. At the time current through the winding 21 becomes sufficient to provide regenerative drive, it also becomes sufficient to induce a voltage in the winding 31 such that the directing diode 36 decouples the winding 31 from the transistor 35. This operation is accomplished in the following manner. Referring to FIG. 2, it is seen that when the positive square wave base drive applied to the transistor 35 (FIG. 2a), it is turned on. Since there is virtually no voltage drop across the diode 36 and the transistor 35 (FIG. 2g), the anode and cathode of the diode 36 are at the same potential as the negative terminal 33. The voltage across the dot end of the winding 31 and the terminal 33, $v_d$, is zero (FIG. 2h). However, as the current flowing through the winding 21 increases, additional current is induced through the winding 31 and causes the potential at the anode of the diode 36 to go below that of the cathode. When this occurs, $v_d$ becomes negative and the diode 36 is back biased and decouples the winding 31 from the transistor 35. The values of the components may be chosen so that even under moderate load, the load current supplies enough voltage to decouple the winding 31 during most of the half cycle during which the transistor 35 conducts.

The present arrangement is also particularly advantageous in providing reliable commutation. Commutation is a relatively simple matter when the load is of the resistive or of the leading type. As seen in FIGS. 2c and 3c no load current is flowing through the transistor 14. Thus no current is supplied to the winding 21 which would be coupled to provide drive to the transistor 14 when it is desired to turn it off. However, commutation is more difficult in the case of a lagging load. As seen in FIG. 4c, current which would tend to keep the transistor 14 on is flowing from the transistor 14 through the winding 21. This current must be removed from the winding 21. Assume now that the circuit is operating in the half cycle in which the transistor 37 and the transistor 13 are conductive. Commutation is provided to turn the transistor 13 off and the transistor 14 on. Just prior to the end of the half cycle, positive current is flowing from the positive terminal 11 through the transistor 13 and winding 21 to the load 19. Since load current is flowing into the dot end of the winding 21, that end is positive. Due to the coupling between the windings 21 and 31, voltage at the dot end of the winding 31, and consequently the collector voltage of the transistor 35 is positive and also high. When the transistor 35 is turned on and the transistor 37 is biased off by the square wave trigger voltage, the voltage across the winding 21 is forcibly reversed. It is cancelled by the collector current of the transistor 35, which is also the current now flowing through the winding 31.

As before, since the transistor 35 is turned on, current is coupled to turn the transistor 13 off and turn the transistor 14 on. As seen in FIG. 4d, when the transistor 14 is first turned on current flows through the diode 29. Load current would also tend to flow through the transistor 14 in the reverse direction and through the winding 21 in a direction to turn the transistor 14 off. However, the magnitude of load current flowing in the collector-base junction of the transistor 14 is limited by the resistor 25. The load current through the winding 21 is more than cancelled by the drive current coupled from the winding 31. It is seen that reliable commutation is achieved simply through the use of a single current transformer 20 and the interaction of the currents flowing in the windings therein. No delicate balance arrangements, such as providing a low impedance path to remove lagging load current from the bases of the transistors 13 and 14, are necessary.

Figure 5:
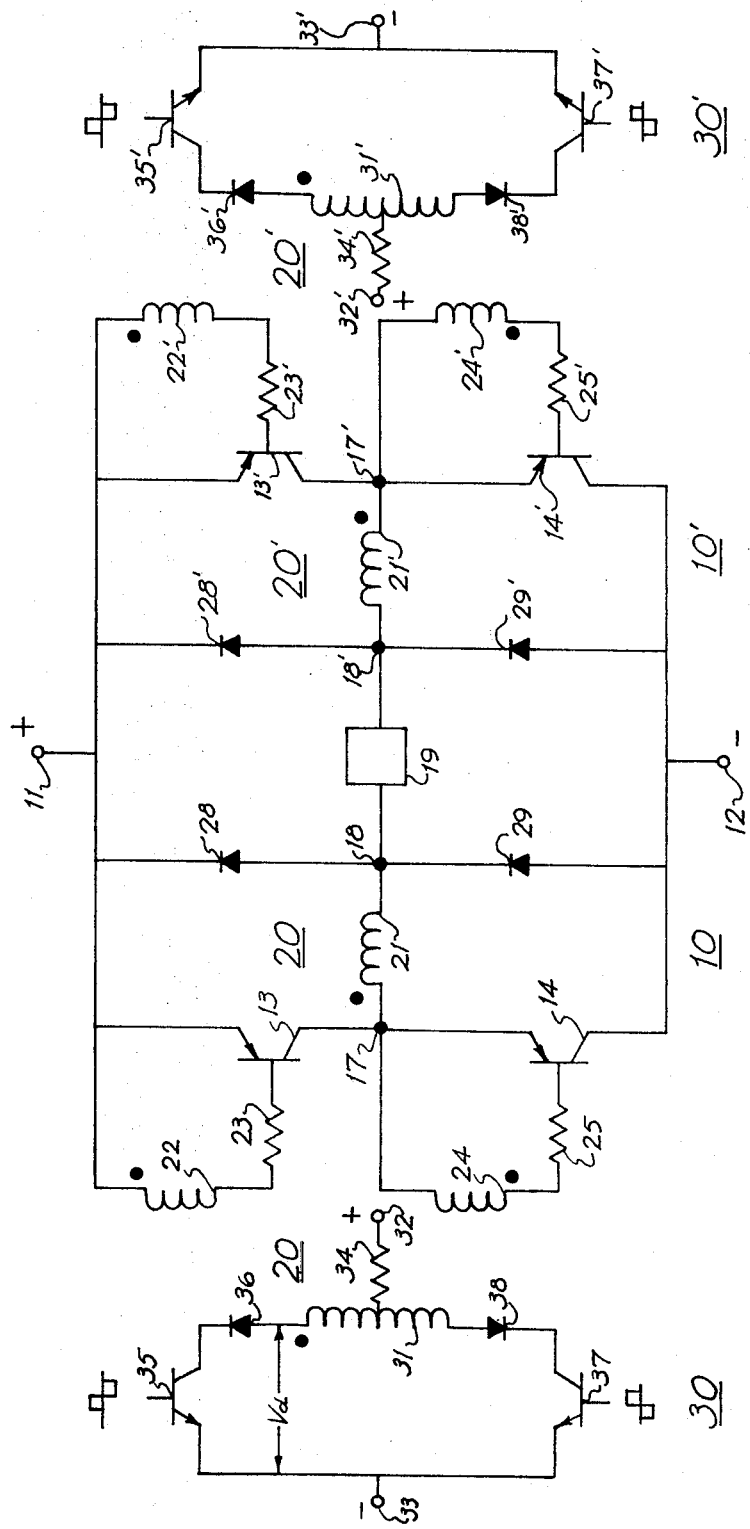
FIG. 5 is a schematic representation of an inverter circuit employing the symmetrical switching circuit of FIG. 1.

The symmetrical switching circuit of FIG. 1 is particularly suited for use in an inverter circuit such as that shown in FIG. 5. The inverter circuit in FIG. 5 consists of first and second current driver circuits 30 and 30' and first and second output circuits 10 and 10'. The same reference numerals are used to denote elements of the circuits 10 and 30 which correspond to the elements shown in FIG. 1, and primed numbers in the circuits 10' and 30' are used to indicate elements which correspond to those in the circuits 10 and 30. Both output circuits 10 and 10' are connected across the positive and the negative terminals 11 and 12 of a unidirectional potential source (not shown). Each of these circuits operates in the same manner as the circuit shown in FIG. 1. The load 19 is connected between the output terminals 18 and 18'. The driver circuits 30 and 30' operate in the same manner as the driver circuit 30 of FIG. 1. However, separate square wave trigger sources are provided for the driver circuits 30 and 30'. Such an arrangement is highly advantageous where it is desirable to provide a regulated voltage to the load 19.

The output circuits 10 and 10' operate simultaneously so that simultaneous outputs are supplied to the load from the output terminals 18 and 18'. However, the phase relationship between the square wave triggering input to the driver circuit 30 and the driver circuit 30' may be varied. When there is no phase difference between the square wave inputs to the driver circuits 30 and 30', equal outputs appear simultaneously at the output terminals 18 and 18'. Since the voltage across the load 19 is equal to the difference between the voltages applied from the terminals 18 and 18', no voltage is applied across the load 19. However, were the driver circuits 30 and 30' operated 180° out of phase, complementary outputs would appear at the terminals 18 and 18' and the potential difference across the load 19 would be double the potential supplied by the unidirectional potential source. By varying the phase difference of the square wave trigger inputs to the driver circuits 30 and 30', continuous voltage regulation in the inverter may be achieved.

The arrangements shown in FIG. 1 and FIG. 5 employ germanium PNP transistors. However, the present invention is not limited to the use of such PNP transistors. In applications where the characteristics of the PNP transistors are not necessary, the complementary transitor arrangement shown in FIG. 6 may be utilized. This circuit may be desireable due to its simplicity.

A driver circuit 30 is employed to couple drive current to an output circuit 50. The driver circuit 30 is identical in construction and operation to the driver circuit 30 of FIG. 1. Accordingly, the same reference numerals are employed to denote corresponding circuit components. The circuit of FIG. 6 employs a current transformer 60.

The output circuit 50 is connected across a unidirectional potential source (not shown) by means of a positive terminal 51 and a negative terminal 52. The output circuit 50 alternately connects the terminals 51 and 52 to an output terminal 53. The switching elements comprise an NPN transistor 55 and a PNP transistor 56 having their emitter-collector circuits connected in series between the terminals 51 and 52. The collector of the transistor 55 is connected to the positive terminal 51 while the emitter is connected to a terminal 57. Similarly, the collector of the transistor 56 is connected to the negative terminal 52 while its emitter is connected to the terminal 57. A drive winding 61 of the current transformer 60 is connected in the emitter-base circuit of both transistors 55 and 56 in series with a current limiting resistor 62. The dot end of the winding 61 is connected to the resistor 62, while the other end is connected to the terminal 57. The resistor 62 is connected to the bases of the transistors 55 and 56. Drive current is coupled from the drive current winding 31 to the winding 61. In order to provide for regenerative drive, a load current winding 65 of the current transformer 60 is connected in series between the terminal 57 and the output terminal 53. A "pump-back" diode 66 is connected between the output terminal 53 and the positive terminal 51. Similarly, a "pump-back" diode 67 is connected between the output terminal 53 and the negative terminal 52.

The output circuit 50 operates in a manner similar to that in which the output circuit 10, illustrated in FIG. 1, operates. However, since complementary transistors are used, only one winding 61 is necessary to bias one of the transistors 55 or 56 off and turn the other one on. As explained above, if the transistor 35 in the driver circuit 10 is turned on, current flows through the winding 31 such that the dot end is negative with respect to the other end. Thus the winding 61 couples negative current to the bases of the transistors 55 and 56. PNP transistor 56 is turned on, and NPN transistor 55 is biased off. Circuit operation then proceeds as in the circuit of FIG. 1. The negative terminal 52 is coupled to the output terminal 53 for the duration of the half cycle. During the next half cycle, the positive terminal 51 is connected to the output terminal 53.

The present invention may also comprise a bridge-type driver circuit and a center tapped output circuit.

As seen in FIG. 7, a full bridge driver circuit 70 is employed to initiate switching operation in a center tapped output circuit 90. The bridge circuit 70 comprises a drive current winding 71 connected in series with a voltage drop resistor 72 across a transistor bridge. The bridge comprises NPN transistors 75 and 76 on the left side of the bridge and NPN transistors 77 and 78 on the right side of the bridge. The driver circuit 70 is connected by means of a positive terminal 79 and a negative terminal 80 across a unidirectional potential source (not shown) to provide drive current. The collectors of the transistors 75 and 77 are connected to the positive terminal 79, while the emitters of the transistors 75 and 77 are coupled to opposite ends of the drive current winding 71. The collectors of the transistors 76 and 78 are coupled to opposite ends of the drive current winding 71 while their emitters are connected to the negative terminal 80, A first directing diode 81 is connected between the emitter of the transistor 77 and the dot end of the drive current winding 71 and poled to permit conduction from the terminal 79 to the terminal 80. A diode 82 is similarly poled and is connected between the dot end of the winding 71 and the collector of the transistor 78. A first square wave voltage is applied to the bases of the transistors 77 and 76 and a complementary square wave voltage is applied to the bases of the transistors 75 and 78. In this manner, drive current of alternating polarity is supplied through the drive current winding 71. The drive current winding 71 is included within a current transformer 85.

The switching circuit 90 operates to connect a positive terminal 91 and the negative terminal 92 which are connected across a unidirectional potential source (not shown) so that current flows through an output winding 93 in alternating directions. The output winding 93 is coupled by a winding 94 to a load 95. The switching elements comprise NPN transistors 96 and 97 having their emitter-collector circuits connected in parallel across the terminals 91 and 92. A drive winding 100, included in the current transformer 85, and a current limiting resistor 10 are connected in series between the bases of the transistors 96 and 97. A diode 105 is connected across the emitter-base circuit of transistor 96 to provide a low impedance path for base drive while a diode 106 is connected across the emitter-base circuit of transistor 86.

In order to provide regenerative drive for transistor 96, a winding 102 of the current transformer 85 is provided with its dot end connected to the collector of the transistor 96 and its other end connected to one end of the output winding 93. Similarly, a winding 103 of the current transformer 85 is connected between the collector of the transistor 97 and the other end of the winding 93. The winding 102 is oppositely poled with respect to the winding 103.

OPERATION

Assume transistors 75 and 78 are to be turned on by the square wave input thereto and transistors 77 and 76 are to be biased off. Current flows from the terminal 79 through the transistor 75 through the winding 71 and out the dot end. The current returns to the terminal 79 through the directing diode 82 and the transistor 78. The current flowing through the winding 71 is coupled to the winding 100. Since the dot end of the winding 71 is negative with respect to the other end of the winding 71, the winding 100 of the current transformer 85 couples a positive current to the base of the transistor 96 and a negative bias to the transistor 97. The transistor 96 is turned on and the transistor 97 is biased off. Once the transistor 96 conducts, current flows from terminal 91 through half of the winding 93 to the winding 102. Current flows out the dot end of the winding 102 through the transistor 96 to the terminal 92.

Operation of the circuit proceeds similarly to that of the circuit of FIG. 1. Load current now flows through the winding 102 which is coupled to the winding 100 to provide regenerative drive current. If the load current is of sufficient magnitude, the winding 102 induces a current sufficient in the winding 71 so that the diode 82 decouples the winding 71 from the transistor 78.

It is thus seen that the arrangement embodied in the present invention is a highly reliable one in which a single current transformer performs several functions. First, it couples current drive from a driver circuit through a switching circuit to initiate switching operation. It couples load current to the switching elements for regenerative drive, and couples commutating current to the switching elements also. Commutation is accomplished entirely by current reversal at the base inputs of the switching elements. No delicate circuit balances are required, i.e., no low impedance shunt paths need be provided for switching currents.

The present invention may take many forms. For example, the output circuit included in the symmetrical switching circuit may comprise a bridge arrangement. It could also comprise a center tapped arrangement. Many modifications may be made in the construction of the invention without departing from the scope thereof as defined in the following claims.

We claim:

1. A symmetrical switching circuit, having first and second terminals for respective connection to the positive and negative terminals of a unidirectional source of potential and an output terminal for connection to a load, comprising in combination:
   a. a current transformer having a plurality of windings;
   b. means for connecting a drive current of alternating plurality through a first winding of said transformer;
   c. first and second transistors of complimentary conductivity type, having their emitter-collector circuits connected in series between said first and second terminals;
   d. a central terminal connected between said first and second transistors;
   e. means connecting a second winding of said current transformer between said central terminal and the output terminal; and
   f. coupling means comprising a third winding of said current transformer having a first end coupled to said central terminal and a second end coupled to the bases of said first and second transistors, said coupling means being poled to bias said first transistor off and turn said second transistor on when the drive current flows through said first winding in a first direction and to bias said second transistor off and turn said first transistor on when the drive current flows through said first winding in the opposite direction, said second winding being poled to couple a current to said coupling means in the same direction as that coupled from said first winding.

2. A symmetrical switching circuit, having first and second terminals for respective connection to the positive and negative terminals of a unidirectional source of potential and an output terminal for connection to a load, comprising in combination:
   a. a current transformer having a plurality of windings;
   b. means for connecting a drive current of alternating polarity through a first winding of said transformer;
   c. first and second transistors having their emitter-collector circuits connected in series between said first and second terminals;
   d. said current transformer having coupling means connected in the base circuits of said first and second transistors and poled to bias said first transistor off and turn second transistor on when the drive current flows through the first winding in a first direction and to bias said second transistor off and turn said first transistor on when the drive current flows through said first winding in the opposite direction;
   e. a central terminal connected between said first and second transistors;
   f. means connecting a second winding of said current transformer between said central terminal and said output terminal for coupling a current to said coupling means connected in the base circuits of said first and second transistors, said second winding being poled to couple a current in the same direction as that coupled from said first winding, whereby said first and second transistors are turned on and off by current coupled from one winding of said current transformer; and said means for coupling a drive current comprising:

g. third, fourth, fifth and sixth transistors connected in a bridge arrangement, the ends of the bridge adapted to be coupled to a source of unidirectional potential, means connecting said first winding across the center of said bridge, first and second directing diodes connected in series between the transistors on one side of the bridge to permit conduction of drive current through said first winding, the circuit values being chosen so that when said second winding induces a voltage in said coupling means sufficient to turn one of said first and second transistors on and the other transistor off, it induces a voltage sufficient in said first winding to decouple said first winding from said bridge circuit.